United States Patent Office 3,301,607
Patented Jan. 31, 1967

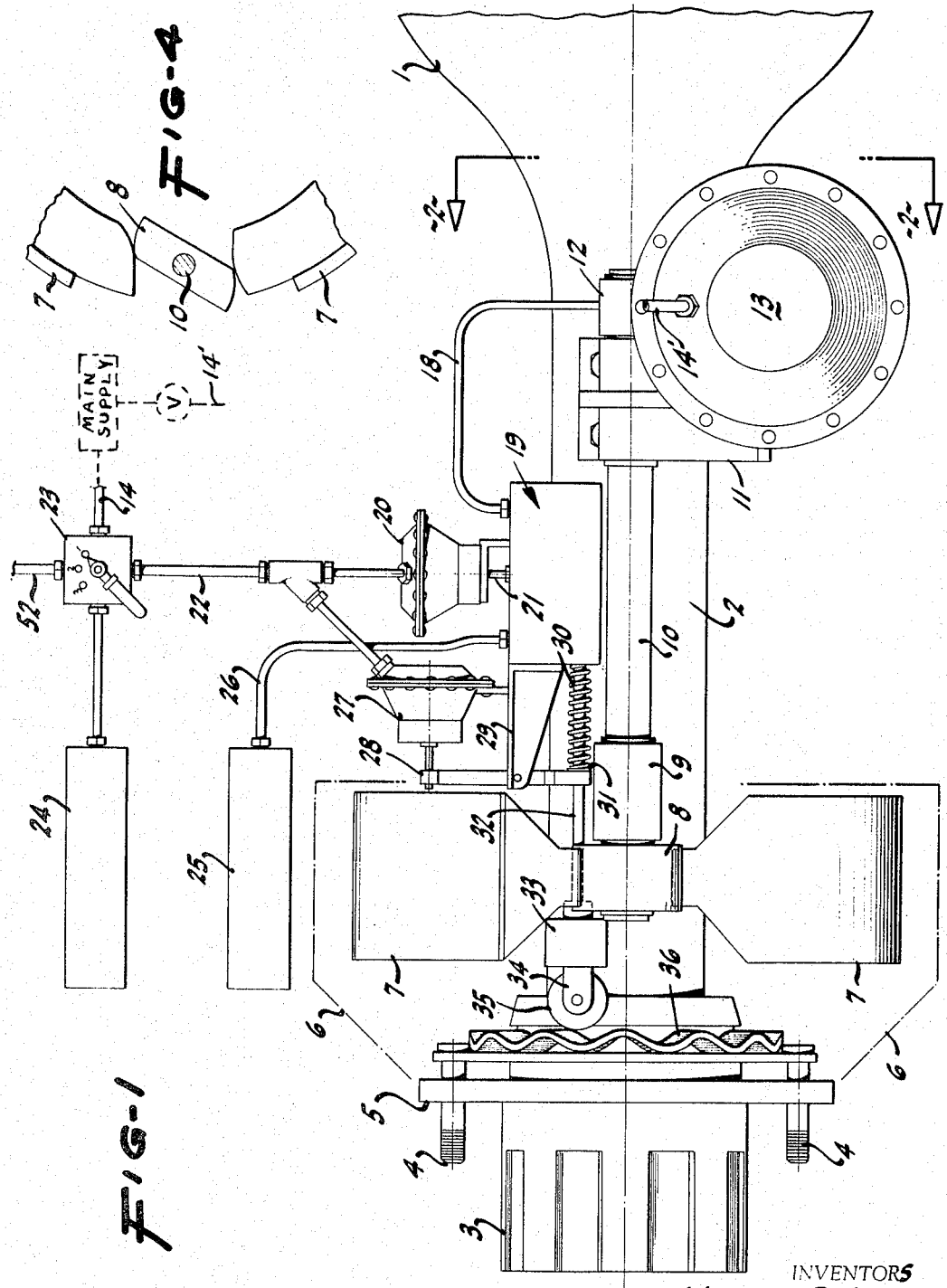

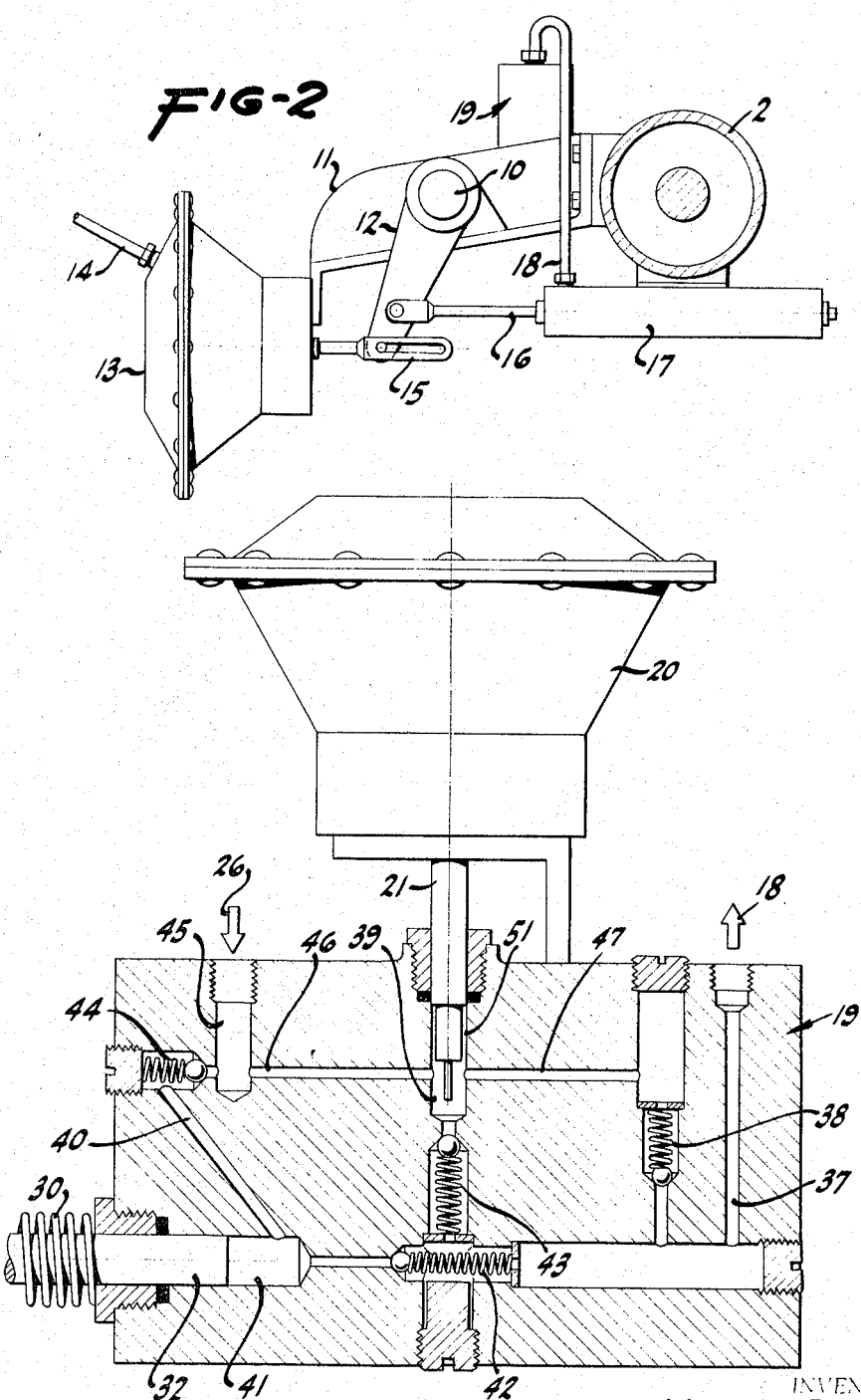

3,301,607
CAM OPERATED BRAKING SYSTEM
Michael D. Collins and Frank R. Johnson, both of 2233 Nordyke Ave., Santa Rosa, Calif. 95401
Filed Aug. 20, 1964, Ser. No. 390,956
3 Claims. (Cl. 303—10)

The present invention relates in general to a cam-driven automatic braking system for trucks and buses, or the like, which is operable upon failure of conventional brakes to automatically engage brake shoes with brake drums for stopping the vehicle.

In the operation of heavy vehicles, such as trucks and buses, or the like, it is conventional to employ some type of power system for the application of brakes. Commonly, there is utilized an air brake system which is capable of applying a large force to the brake shoes, to thereby achieve the necessary stopping power for the heavy vehicle. Air pressure for the operation of this type of system is usually obtained from a compressor driven by the engine of the vehicle. While these types of systems are highly advantageous and widely employed, it is recognized that they are subject to brake failure resulting from loss of air pressure, which may arise from engine failure, or failure of air lines in the brake system.

Because of these possibilities of brake failure, there have been developed a wide variety of automatic braking systems adapted to apply brakes to the vehicle upon failure of the air pressure. For example, one or more auxiliary high-pressure air tanks may be connected to the system so as to provide a reserve of high-pressure air available after engine failure. This solution to the problem, of course, does not overcome the difficulties arising from breakage of an air line. Alternatively, there have been developed spring actuated brakes and various systems for generating braking power from the moving vehicle. As an example, it has been proposed to mount friction wheels in position to engage truck or bus wheels, for the purpose of energizing some type of auxiliary brake system. In addition, there have been proposed certain gear connections, either to a drive shaft, axle, or wheel hub, which serve upon command to supply power for operation of an auxiliary brake system.

The present invention falls within the general category of auxiliary braking systems powered from the kinetic energy of the moving vehicle. The present invention provides a positive acting system for manually or automatically forcing brake shoes against brake drums of a vehicle, either upon failure of air pressure in an air brake system, or at the control of the vehicle operator. Power for the auxiliary braking system of the present invention is obtained from rotation of the vehicle wheels; however, this invention does not require the utilization of friction drive or gear connections. There is provided, in accordance herewith, an extremely simple positive drive for hydraulically applying brakes to the vehicle within one or two full rotations of the vehicle wheel. Furthermore, the present invention provides for the application of brakes to a greater extent than is normally available with air brake systems, and consequently this invention provides for overcoming "brake fade" commonly encountered in braking systems upon heavy vehicles.

The present invention is illustrated as to a single preferred embodiment thereof in the accompanying drawings, wherein:

FIGURE 1 is an elevational view of the system of this invention mounted upon a truck axle;

FIGURE 2 is a sectional view taken in the plane 2—2 of FIGURE 1;

FIGURE 3 is a central sectional view through the hydraulic pump of the present invention; and FIGURE 4 is a partial view illustrating brake shoes and actuating member therefor.

Considering now a single preferred embodiment of the present invention as illustrated, and referring to the drawings, there is shown in part a differential housing 1 from which extends an axle housing 2 with a wheel hub 3 mounted at the outer end of the axle through the housing. Conventional wheel lugs 4 extend through the hub flange 5 and a conventional finned brake drum 6 is carried on the hub. Within the brake drum 6, which rotates with the hub, there are provided conventional brake shoes 7 adapted to be moved outwardly against the brake drum by an S-cam 8. A journal 9 adjacent this S-cam 8 carires a rotatable shaft 10 secured to the cam, and also journalled at a mounting bracket 11 adjacent the differential housing. Further conventional portions of a normal air brake system include a brake arm 12 fixed to the inner end of the brake shaft 10 to rotate same and thus force the brake shoes against the brake drum. An air brake unit or booster 13, in the form of a diaphragm unit operated from an air line 14', has a shaft 15 extending therefrom for engagement with the end of the brake arm 12. This shaft 15 is slotted to receive a pin on the end of the lever 12 so that upon translation of the shaft 15 the brake arm 12 is rotated to turn the shaft 10 and thence to apply the brakes.

In conjunction with the foregoing conventional air brake system of a truck, bus, or the like, the present invention provides for automatically forcing the brake shoes against the brake drum upon failure of air pressure in the air brake system. The present invention provides an additional connection to the brake arm 12 in the form of a rod 16 extending from a ram jack 17. This rod is pivotally connected to the brake lever 12 adjacent the end thereof, as illustrated in FIGURE 2. The ram jack 17 is operated through a hydraulic line 18 extending from the output of an hydraulic pump 19. The pump is controlled by an actuator or booster 20 having a shaft 21 depending therefrom into the hydraulic pump. A pressure line 22 extends from this actuator 20 to a control valve 23 that is, in turn, connected to a pressure reservoir 24. A vented fluid reservoir 25 is connected by a hydraulic line 26 to the inlet of the pump 19 for providing hydraulic fluid thereto. An additional actuator 27 is connected to the pressure line 22, and has a shaft extending therefrom into connection with a retaining pin 28 pivotally mounted upon a bracket 29 that also carries an additional actuator or booster 27. This bracket 29 may, for example, be secured to one end of the hydraulic pump 19 in extension toward the hub 3 therefrom. Suitable mounting means may be provided for securing the hydraulic pump to the axle housing 2 with the actuator 20 then mounted upon the hydraulic pump. A compression spring 30 is disposed between one end of the hydraulic pump 19 and a collar 31 about a pump rod 32. The lower end of the pivotally mounted pin 28 is forked to fit about the rod 32 against the washer 31 secured to the rod, and thus to normally maintain the spring 30 in a compressed state with the rod maintained at the right of the possible travel thereof, as illustrated in FIGURE 1. This rod 32 is journalled at 33 to a fork 34 that carries a cam roller 35. In the position illustrated in FIGURE 1 of the drawings, the rod is retained by the pin 28 from movement to the left. An annular convoluted cam 36 is secured to the back of the wheel hub 3, as by means of the lug bolts 4, and as shown, the cam roller 35 is normally maintained out of engagement with this cam 36 which rotates with the wheel hub. Release of the rod 32 by pivotal movement of the pin 28 causes the cam roller 35 to be pressed against the cam surface 36 by the spring 30, and because of the convoluted shape of the cam, the rod 32 will thus be reciprocated as the wheel hub rotates.

The reciprocation of the rod 32 is herein employed to pump hydraulic fluid under pressure into the ram jack 17. As shown in FIGURE 3, the hydraulic pump may be formed as a block having an outlet passage 37 extending to the outlet pipe 18. A spring-loaded ball check valve 38 is provided in a bore of the block, and an adjacent bore 39 serves to receive the actuator shaft 21. A small passage 40 within the block communicates with a pump chamber 41, into which the end of the pump rod 32 extends, and this chamber, in turn, is connected through a spring-loaded ball check valve 42 to an elongated passage communicating with the outlet passage 37, and the inlet of the ball check valve 38. An additional ball check valve 43 communicates between the inner end of the bore 39 and the passage of the valve 42. A small ball check valve 44 communicates between the aforementioned passage 40 and an inlet passage 45 extending from the point of entry of the inlet pipe 26 from the reservoir 25. A small bypass passage 46 extends from the inlet passage 45 to the actuator shaft bore 39, and another small passage 47 in alignment with this passage 46, extends onward from the bore 39 to the opening behind the ball check valve 38. The bottom end of the actuator shaft 21 has an elongated tongue formed thereon, so that upon full insertion of the shaft into the pump block, this tongue will unseat the ball check valve 43, as may be seen from FIGURE 3.

The hydraulic pump 19 operates by reciprocation of the rod 32 serving as a pump piston acting upon hydraulic fluid in the pump chamber 41. As the rod moves to the right in FIGURE 3, hydraulic fluid in the chamber 41 will be increased in pressure to unseat the valve 42, and thence pass therethrough and through the outlet passage 37 to the ram jack 19 through the connecting line 18. Upon a return stroke of the rod 32, i.e., movement of same to the left in FIGURE 3, the check valve 42 will be re-seated because of the drop in pressure within the pump chamber 41, and this drop in pressure will unseat the check valve 44, so that fluid is drawn into the pump chamber from the reservoir 25 through the inlet line 26, inlet passage 45, and the small communicating passage 40 to the pump chamber. As fluid is forced from the pump 19 through the outlet line 18, it enters the ram jack 17 and forces an internal piston thereof to the right in FIGURE 2 so that the jack shaft 16 moves to the right to swing the brake arm 12. As the pressure builds up in the ram jack to repeated reciprocations of the pump shaft 32, a sufficient pressure will be reached for the relief valve 38 to unseat. This pressure is adjustable by tigthening or loosening the force applied to the spring forming a part of this relief valve. At the predetermined relief pressure, another surge of hydraulic fluid unseating the valve 42 will raise the ball of the relief valve 38 so that fluid then flows back through the passage 47 and thence through the bore 39 along grooves 51 formed longitudinally of the actuated shaft 21 so as to pass out the small passage 46 to the hydraulic tank 25. In this manner, the pump operates to maintain a steady maximum pressure on the ram jack and, consequently, to hold the brakes fully "on" through operation of the system of this invention till released.

Considering further operation of the booster or actuator unit 20, it is noted that same is quite conventional in including a diaphragm which is spring-loaded from the bottom so that the actuator shaft 21 is normally raised into the position shown in FIGURE 3. By the application of air pressure above the diaphragm, the integral spring of the actuator is compressed so that the actuator shaft 21 is depressed and moves downwardly in the bore 39 of the pump. Full downward movement of the shaft forces the tongue at the bottom thereof into contact with the ball of the check valve 43 so as to unseat same and, consequently, to directly connect the high pressure side of the pump back to the hydraulic reservoir 25. Hydraulic pressure within the ram jack is thus relieved under this condition and fluid flows backwardly through the line 18 through the passage 37 and through the valve 43 and passage 46 to the reservoir. Provision is made, as by means of the grooves 51, to allow communication through the bore 39 between the passages 46 and 47, as well as through the valve 43. In the position of the actuator 20, illustrated in FIGURE 3, the shaft 21 is raised so that the passages 46 and 47 are connected through the bore 39 and, thus, hydraulic fluid returns to the tank only when the relief valve 38 is unseated. Upon re-application of pressure to the actuator, the shaft 21 is depressed so that the tongue thereon unseats the check valve 43 and the entire hydraulic pressure in the ram jack is relieved back to the tank.

Considering now the operation of the present invention, it will be seen that the normal airbrake system is operated by actuation of the unit 13 so that the element 15 moves to the right in FIGURE 2 to rotate the brake arm 12, and consequently turn the S-cam 10 to force brake shoes 7 outwardly against the brake drum 6. Failure of the airbrake system for any reason causes a drop in air pressure so that the auxiliary system of the present invention becomes operable. A drop in air pressure in the line 22 causes the actuator 20 to raise the shaft 21 and at the same time the actuator 27 is operated to thereby release the pivot arm 28. Thus the spring 30 is released to press the cam wheel 35 against the cam 36. Assuming that the vehicle is in motion at this time, the wheel thereof is rotating and consequently the cam 36 is turning with the wheel hub. As the cam 36 rotates, the cam wheel 35 is reciprocated by engagement with the convoluted configuration of the cam 36. Reciprocation of the cam wheel 35 thus reciprocates the shaft or rod 32 and consequently pumps hydraulic fluid into the ram jack 17.

Reciprocation of the rod 32 compresses hydraulic fluid in the chamber 41 of the pump 19 to thus unseat the valve 42 and force fluid through the pump passage 37 and through the outlet line 18 into the ram jack 17. As the rod 32 returns outwardly from the hydraulic pump, fluid enters the chamber 41 from the reservoir 25 through the line 26, the passage 45, and thence through the unseated check valve 44 in the passage 40. Subsequent movement of the rod 32 to the right in FIGURE 3 again forces hydraulic underpressure into the ram jack and consequently the jack 17 moves the rod 16 thereof to the right in FIGURE 2 and thus swings the brake arm 12 to thereby rotate the brake shaft 10 and the S-cam 8 attached thereto for forcing the brake shoes 7 outwardly against the brake drum 6. It is particularly noted in this respect, that the arm 15 of the actuator 13 in the conventional airbrake system is slotted to accommodate pivotal motion of the brake arm 12, and thus the ram jack 17 may rotate the brake arm without interference from the actuator arm 15. The ram jack 17 serves to pivot the brake arm 12 further than the airbrake system normally pivots same, and consequently is operable to rotate the S-cam 8 to the maximum operable rotated position thereof. Consequently, the brake shoes are moved further outwardly against the brake drum by the present invention, than is normally possible with the conventional airbrake system of the vehicle. The present invention not only operates to automatically apply the brakes of the vehicle upon air pressure failure, but, furthermore, is applicable to move the brake shoes further outward against the brake drum than is possible with the conventional airbrake system. Under the circumstance wherein overheating of the brake system occurs, and the brake drum expands to increase the diameter thereof so that the brake shoes do not make good contact therewith, the present invention may be manually operated by the operator of the vehicle in order to apply brakes through the present invention. The present invention thus serves to overcome difficulties normally encountered with "brake fade," i.e., inability of the brake shoes to press sufficiently against the brake drum to exert adequate stopping power. This manual operation of the present invention may be actuated by the operator through the valve 23 at any time, as further explained below.

Operation of the brake system of the present invention has shown that only a relatively few reciprocations of the rod 32 are necessary to pump an adequate amount of hydraulic fluid into the ram jack 17 to fully apply brakes to the vehicle. Thus, within one or two revolutions of the wheel upon which the convoluted cam 36 is mounted, full brakes will be applied to the vehicle. Full brake pressure will be maintained at all times during which the system of the present invention is actuated. The present invention is not limited to automatic application of brakes during high speed travel of the vehicle, wherein brake failure may be expected, for the system is also applicable to prevent rolling of the vehicle when same is parked. Thus, if for any reason air pressure reduces in the airbrake system of a parked truck, bus, or the like, having the auxiliary brake system of this invention attached thereto, at most one or two turns of the wheel will be sufficient to apply full brakes and stop the vehicle.

Considering now the manner in which the present invention operates on a vehicle having a conventional airbrake system, it will be seen in FIGURE 1 that a branch of the air line 14 of the conventional system is connected to the valve 23, and in the illustrated position of the valve is directly connected to the output line 22 therefrom. In this valve position and with adequate air pressure in the line 14, the present invention will be restrained from operation and will be maintained in the position illustrated in FIGURE 1 of the drawings. Upon failure of the air pressure or undue reduction of same below a predeterminable limit, the present invention will become operable in that the actuators 20 and 27 will operate to thereby raise the actuator shaft 21 into the position shown in FIGURE 3 and release the spring 30 so that hydraulic fluid is pumped to the ram jack 17 for extending the arm thereof, as indictaed in FIGURE 2. While a variety of different possible connections to the conventional airbrake system is possible, the one illustrated in FIGURE 1 employs a three-position valve in which position number 1 has been previously described. Position number 2 directly connects the air line 22 to air vent 52, illustrated in FIGURE 1. Inasmuch as the operating valve 23 is located in the cab of the vehicle outfitted with the present invention it is thus possible for the operator of the vehicle to switch the valve to position number 2 and thereby manually remove pressure from the line 22 by venting it to atmosphere and, consequently, activate the brake system of this invention. Clearly, the result is the same whether the valve is in position number 1 and the air pressure unduly decreases in the air line 14, or the valve is in position number 2, and thus the operator is provided with the ability to actuate the present invention from the cab of the vehicle. Position number 3 of the valve 23 interconnects the auxiliary high-pressure tank 24 to the output line 22 leading to the actuator units 20 and 27. Such a connection re-applies pressure to these actuators and, consequently, de-activates the brake system of this invention. This connection is provided in order that the brakes may be released after application by this invention. Under certain circumstances, it may be necessary to release the brakes applied by this system before air pressure is available from the main airbrake system. This situation could arise in connection with towing of the vehicle, for example. This operation is available herein by turning the valve 23 to position number 3 so that the high-pressure air in the auxiliary tank 24 will operate the actuators 20 and 27 to release hydraulic pressure from the ram jack so that the brakes are released and also to withdraw the cam follower 35 from the cam 36. This system is then reset in position to be again utilized, if desired, to re-apply the brakes, but the wheels are free so that the vehicle can be moved.

In brief summary of the present invention, it will be seen that there is provided hereby an auxiliary hydraulic brake system which can be activated either upon failure of a conventional air brake system or at the command of the vehicle's operator and which is powered by the kinetic energy of the moving vehicle. In brief, a reduction in air pressure in the line 22 of this invention, either by failure of conventional air brake system pressure or deliberate venting of the line 22 to the atmosphere, releases the pin 28 so that the spring 30 forces the shaft 32 and roller cam 35 carried thereon outwardly against the annular convoluted cam 36 carried by the wheel hub of the vehicle As the wheel rotates, the cam follower 35 is thus reciprocated and, consequently, the rod 32 carrying this cam follower likewise reciprocates to pump hydraulic fluid via the hydraulic pump 19 into the ram jack 17 so that the shaft thereof is moved outwardly for pivoting the brake arm 12. Pivoting of this brake arm turns the S-cam 8 to force the brake shoe 7 outwardly against the brake drum.

As previously noted, the ram jack 17 operates to pivot the brake arm 12 further than it is normally pivoted by the conventional air brake system and this may, for example, be accomplished by attaching the ram jack shaft 16 closer to the brake shaft 10, as shown in FIGURE 2. This increased rotation of the brake arm causes the S-cam 8 to turn further than normal and, consequently, to force the brake shoe 7 further outwardly against the brake drum than normal. The present system thus provides for insuring positive engagement of the brake shoes against brake drum even during conditions wherein the brake drum has materially expanded away from the brake shoes, as by overheating.

Only a maximum predetermined pressure is attained in the hydraulic system of this invention, for above this pressure the hydraulic fluid raises the relief valve 38 to recirculate fluid back to the reservoir 25. It has been found that only a relatively few reciprocations of the pump shaft 32 is necessary to fully actuate the ram jack 17 and thus apply full braking power to the vehicle. Consequently, even though the vehicle may be parked and the air brake system fail, the present invention will apply full brakes to the vehicle before it has moved more than one or two turns of the wheels thereof. After application of the brakes by the present invention, these brakes are maintained fully applied until intentionally released by the operator. This release is achieved by re-application of pressure to the line 22 leading to the actuators 20 and 27 of this invention. This necessary air pressure may be obtained either from the line 14 of the conventional air brake system, assuming than the pressure level is resumed therein, or may be obtained by turning the valve 23 to position 3 so that the high pressure auxiliary tank 24 is connected to the system of this invention. In either case, the actuators 20 and 27 are operated upon to withdraw the cam follower from the cam and to relieve hydraulic pressure from the ram jack. In this latter circumstance, the system of the present invention is again fully operable at the control of the operator for re-activation by turning the valve 23 to position 2, or to standby by turning the valve 23 to position 1 wherein it again serves as a safety braking system for the vehicle.

There has been described above one preferred embodiment of the present invention in which the system includes at least certain conventional units, but provides in combination a unique auxiliary braking system. The safety factor in air brake systems is materially increased by the present invention, and a degree of control afforded the operator of the vehicle having air brakes high commends the system hereof to wide applicability. While it is true that the present invention in common with certain other auxiliary braking systems operates to fully apply brakes to a vehicle upon failure of air pressure, this is widely recognized as being highly preferable to the alternative of an entire lack of brakes. Also, the present invention does provide the safety and reliability of hydraulic brakes, together with positive acting and relatively simply constructed drive means differing substantially from prior art systems.

It is not intended to limit the present invention to the details of the foregoing description or accompanying illustration, but instead reference is made to the appended claims for a precise delineation of the true scope of this invention.

What is claimed is:

1. An auxiliary brake system for vehicles equipped with airbrakes comprising an annular convoluted cam firmly affixed to a wheel hub for rotation therewith, a spring-loaded rod mounted for reciprocation and having a cam roller at one end thereof adjacent said cam and urged against the cam to reciprocate by cam rotation, an hydraulic pump operated by said rod reciprocations, a jack connected to an outlet of said pump for operation by pressurized fluid from the pump and having a jack shaft extending therefrom for connection to a brake arm of the vehicle to apply brakes thereto, and control means including a first actuator operable at pressures above said predetermined minimum to hold said rod away from said cam, and a second actuator operable at pressure to release pump pressure at said jack.

2. An auxiliary brake system as set forth in claim 1, further defined by a vented reservoir of hydraulic fluid connected to an inlet end of said hydraulic pump, a relief valve interconnecting outlet and inlet of the pump, and said second actuator having a spring-loaded shaft engaging a valve between said jack and reservoir for opening same up actuator energization with air pressure.

3. An hydraulic brake system for vehicles having airbrakes comprising a ram jack having a shaft adapted for connection to a brake arm of the vehicle to rotate the arm and apply full brakes, means defining an annular cam surface with smoothly interconnected hills and valleys evenly spaced about same, said cam surface being adapted for disposition upon a rotary portion of a vehicle wheel to turn therewith, a cam rod mounted for reciprocation and having a cam follower at one end thereof adjacent said annular cam, a spring urging said cam follower against said cam whereby the cam rod reciprocates with cam rotation, an hydraulic pump driven by said cam rod and connected to said jack for extending the jack shaft, a first actuator operable by air pressure and connected to hold said cam follower out of engagement with said cam, a second actuator operable by air pressure to relieve fluid pressure in said jack, and control valving selectively connecting said actuators to the vehicle airbrakes, to atmosphere, or to a high-pressure air tank.

References Cited by the Examiner
UNITED STATES PATENTS

| | | | |
|---|---|---|---|
| 536,002 | 3/1895 | Troth | 303—11 |
| 677,709 | 7/1901 | Stacy. | |
| 2,569,670 | 10/1951 | Hollerith. | |
| 2,645,313 | 7/1953 | Schaadt | 303—2 X |
| 3,107,126 | 10/1963 | Valentine | 303—9 X |

EUGENE G. BOTZ, *Primary Examiner.*